3,247,238
NAPHTHALENE ACYL NITRITES
Nylen L. Allphin, Jr., Pinole, Calif., assignor to Marathon Oil Company, Findlay, Ohio, a corporation of Ohio
No Drawing. Filed May 14, 1965, Ser. No. 455,997
5 Claims. (Cl. 260—466)

The present invention relates to new diacyl nitrites of naphthalene and methods for their preparation.

The new naphthalene diacyl nitrites of the present invention are valuable as chemical intermediates for the preparation of a wide variety of other organic compounds including among others: nitroso compounds which, in turn, can be used as starting materials to production of dyestuffs.

The compounds of the present invention can be produced by treating the corresponding naphthalic anhydride with dinitrogen trioxide ($N_2O_3$) at temperatures preferably below about 0° C. and most preferably from —50 to about —100° C. Preferred reaction times will be from 10 minutes to about 48 hours and the most preferred reaction times will be from 30 minutes to about 15 hours. After the reaction is substantially complete, the dinitrogen trioxide is removed, preferably by drawing off under vacuum and the naphthalene diacyl nitrite may be recovered from the product mixture by fractional crystallization or other conventional separatory methods.

The naphthalic anhydride starting materials for use in the above reaction may themselves be produced by the dehydration of alpha, beta-naphthalene dicarboxylic acids. The preferred technique for this dehydration will be heating at temperatures of preferably from 100 to 350° C. and most preferably from 175 to 250° C. under vacuum, preferably at below 10 mm. Hg. However, other conventional dehydration methods may be employed.

The most preferred starting material for use with the present invention is 2,3-naphthalic anhydride which is preferably produced from 2,3-naphthalene dicarboxylic acid.

In the preparation of the diacyl nitrites, pressure is not narrowly critical and may range from about 0.1 to about 100,000 atmospheres. In most cases, approximately atmospheric pressures will be preferred.

The examples which follow illustrate the invention as applied to the preferred 2,3-naphthalene dicarboxylic acid and the corresponding anhydride. It should be understood that all apparent modifications and variations of the present invention are to be included within the claims appended hereto.

*Example 1*

2,3-naphthalene dicarboxylic acid is heated at 5 mm. of Hg to about 200° C. and the resulting 2,3-naphthalic anhydride is used in Example II which follows.

*Example II*

A 3-necked 500 ml. flask is charged with 10 g. of 2,3-naphthalic anhydride prepared above and cooled to about —70° C. Approximately 7 g. of dinitrogen trioxide is condensed into the flask and the mixture is allowed to stand at —70° C. for approximately 12 hours forming 2,3-naphthalene diacyl nitrites. The reaction mixture is then warmed to room temperature and excess dinitrogen trioxide drawn off with a vacuum pump. The flask is then heated slowly to about 30° C. at which point the diacyl nitrite begins to decompose, evolving nitrogen oxides leaving a white solid behind. After heating for several hours, the flask is evacuated to about 5 mm. Hg. A white solid, 2,3-naphthalic anhydride remains with a melting point of approximately about 244° C. This structure is confirmed by infrared analysis.

What is claimed is:
1. A process for the production of naphthalene diacyl nitrites from the corresponding naphthalic anhydrides comprising the step of treating said naphthalic anhydrides with dinitrogen trioxide at a temperature below about 0° C. and recovering the naphthalene diacyl nitrites thus formed.
2. The process of claim 1 wherein the naphthalic anhydride is 2,3-naphthalic anhydride.
3. The process for the production of acyl nitrites from naphthalenic polycarboxylic acids comprising in combination the steps of dehydrating naphthalene polycarboxylic acids to form the corresponding anhydrides, treating said anhydrides with dinitrogen trioxide at a temperature below about 0° C. and recovering the naphthalene polyacyl nitrites thus formed.
4. The process of claim 3 in which the polycarboxylic acid has two adjacent carboxyl groups.
5. The compound 2,3-naphthalene diacyl nitrite.

References Cited by the Examiner
UNITED STATES PATENTS

| | | | |
|---|---|---|---|
| 3,192,246 | 5/1965 | Crawford et al. | 260—466 |
| 3,192,247 | 5/1965 | Crawford et al. | 260—466 |

OTHER REFERENCES

Elsevier's Encyclopedia of Organic Chemistry, Series III, vol. 12B, pages 4725 and 4727 (1954).

LEON D. ROSDOL, *Primary Examiner.*
REUBEN EPSTEIN, *Examiner.*
L. A. SEBASTIAN, *Assistant Examiner.*